United States Patent

Cifuentes et al.

[11] Patent Number: 4,921,288
[45] Date of Patent: May 1, 1990

[54] DRIVING DEVICE FOR SHIFTING A MECHANICAL ELEMENT, PARTICULARLY FOR USE IN A LOCKING SYSTEM OF A MOTOR VEHICLE

[75] Inventors: Luis Cifuentes; Carlos Sala; Alfonso Vozmediano, all of Madrid, Spain

[73] Assignee: Robert Bosch GmbH, Stuttgart, Fed. Rep. of Germany

[21] Appl. No.: 259,756

[22] Filed: Oct. 19, 1988

[30] Foreign Application Priority Data

Nov. 12, 1987 [DE] Fed. Rep. of Germany ....... 3738416

[51] Int. Cl.⁵ .............................................. E05C 1/06
[52] U.S. Cl. ................................ 292/144; 292/336.3
[58] Field of Search ............ 292/4, 14, 201, 199, 292/172, 142, 144, 336.3; 74/89.17; 192/0.02 R

[56] References Cited

U.S. PATENT DOCUMENTS 4,269,440  5/1981  Gelhard ............................ 292/201 X
4,438,962  3/1984  Soloviff et al. .................... 292/144

FOREIGN PATENT DOCUMENTS 3031066  6/1982  Fed. Rep. of Germany .

Primary Examiner—Richard E. Moore
Attorney, Agent, or Firm—Michael J. Striker

[57] ABSTRACT

A driving unit for a locking bolt preferably of a central locking system of a motor vehicle includes a releasable electric driving motor controlled by an electronic control device which in turn is controlled by a key for controlling a switch pertaining to the driving motor. The driving motor is connected to a worm reduction gear which drives via an intermediate transmission the locking bolt on a predetermined path. Preferably, an automatic clamping clutch having an intermediate or free running position is arranged between the power output of the worm gears and the intermediate transmission member.

12 Claims, 2 Drawing Sheets

DRIVING DEVICE FOR SHIFTING A MECHANICAL ELEMENT, PARTICULARLY FOR USE IN A LOCKING SYSTEM OF A MOTOR VEHICLE

BACKGROUND OF THE INVENTION

The present invention relates to a drive for moving mechanical elements, particularly a locking bolt pertaining to a locking mechanism on a cover for an opening in the body of a motor vehicle. The drive includes a reversible drive motor coupled to a reduction gearing which is operatively connected via an intermediary transmission member with the locking bolt.

A driving device of this kind is known from the German publication DE-OS 30 31 066 and includes a reduction gearing assembled of meshing gears which can be driven even from power output end of the gearing. As a consequence, it is possible that the locking element can be manually shifted out of its locking position and the cover of an opening in the vehicle body can be opened. To prevent such an unauthorized opening, there is provided an intermediary member in the form a toothed rack cooperating with a locking lever which is spring-biased into an unlocking position; the locking lever is pressed into a recess in the frame of the vehicle by a head of an actuation slider movable by a push rod. Since in order to move the actuation slider the push rod must be provided with a further springloaded nose which must be crossed by the slider head when the slider is being transferred from its locking position into its unlocking position, undesirable switching noises result. Furthermore, an additional slider stroke is needed to safeguard the locking element in its locking position, because the additional stroke first causes the actuation slider or its slider head to press the locking lever into the recess.

SUMMARY OF THE INVENTION

It is, therefore, a general object of the present invention to overcome the aforementioned disadvantages.

More particularly, it is an object of the invention to provide an improved driving mechanism for shifting a mechanical element which prevents a manual movement of the element.

Another object of this invention is to enable such a manual switching of the mechanical element only under predetermined conditions of the drive.

In keeping with these objects and others which will become apparent hereafter, one feature of this invention resides in the provision of a reversible electric driving motor coupled to a reduction worm gearing which at its output end is operatively connected via an intermediate transmission member to the mechanical element. Due to the self-locking quality of the worm gearing, the mechanical element can be activated by the driving motor only and cannot be shifted against the worm wheel.

In the preferred embodiment of this invention, there is provided an automatic clutch or coupling, preferably in the form of a three-position clamping or gripping coupling. The coupling has a free running position in which the worm gearing is disconnected from the intermediary transmission member and consequently a manual shifting of the locking bolt is made possible. Consequently, even in the case of a malfunction of the electrical driving motor, manual shifting of the locking element from its closing position is made possible and a corresponding cover can be opened. The coupling further selectively operates in two end or working positions depending on the direction of rotation of the driving motor.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
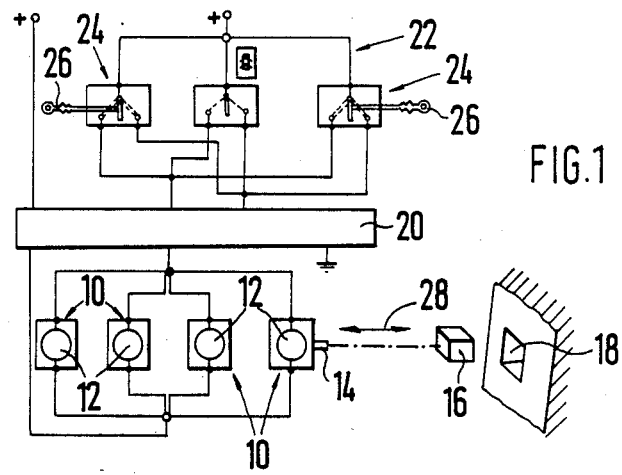
FIG. 1 is a basic circuit diagram of a central locking system of a motor vehicle.

Referring firstly to FIG. 1, a central locking system for a motor vehicle includes a plurality of driving aggregates or units 10 assigned to respective locking points of the motor vehicle. Each driving unit 10 includes a reversible electrical driving motor 12. Each driving unit 10 further includes an intermediate transmission member 14 acting as a power output member which is operatively connected with a locking bolt 16. The locking bolt 16 moves into and from a locking receptacle or socket 18 which is fixedly mounted in a frame of the motor vehicle. In the present example, the locking system includes four driving units 10 controlled by a common electric control device 20 which in turn is controlled by an actuation circuit 22. The actuation circuit and the electronic control device are connected to terminals (+) of a non-illustrated power source. The actuation circuit 22 includes a plurality of actuation switches 24 which in this example are constructed as door locks of a motor vehicle. Each door lock 24 is controlled by a key 26. Depending on the direction of actuation of the key 26 in the lock 24, the electronic control device 20 activates the corresponding driving unit 10 to shift the locking bolt 16 either into or from the locking receptacle 18. This shifting movement to opposite directions is indicated by double arrow 28 in FIG. 1.

Figure 2:
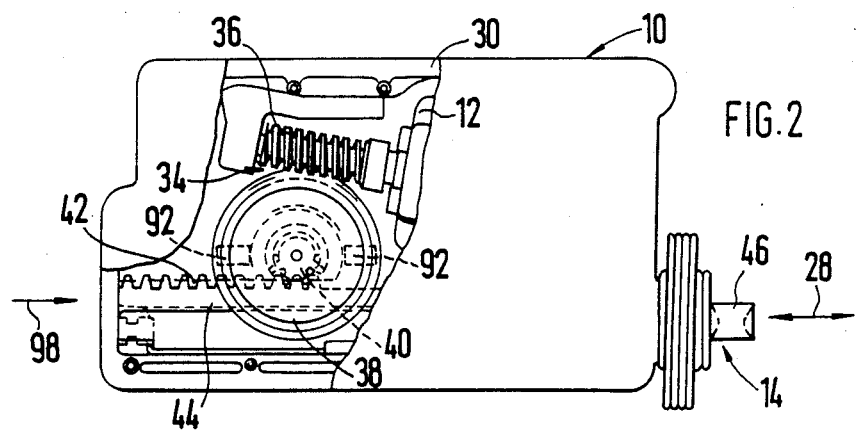
FIG. 2 is an elevational view of a driving unit of the system of FIG. 1.

FIG. 2 illustrates a driving unit 10 on an enlarged scale. The unit includes a housing 30 which encloses a reversible electrical driving motor 12 and a reduction gearing 34 in the form of worm reduction gears. The worm gear 34 includes a worm shaft 36 connected to the armature shaft of the electric motor 12. The worm shaft meshes with a worm wheel 38 which is operatively connected to a pinion 40. The pinion engages teeth 42 of a toothed rack 44 constituting an intermediary transmission member which is terminated with a connection piece 45 projecting from the housing 30 of the driving unit 10. Depending on the direction of rotation of the electric motor 12, the connecting piece 45 is moved in one of the directions indicated by the double arrow 28.

Figures 3, 4:
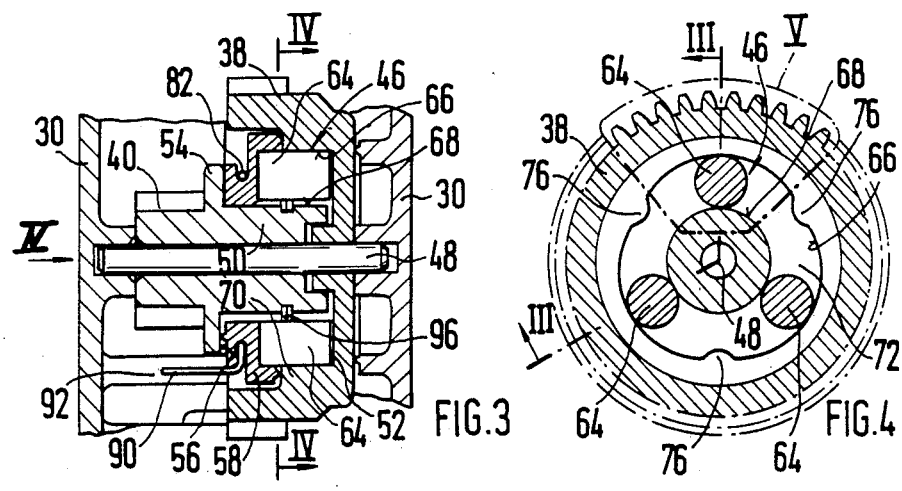
FIG. 3 is a sectional side view of a part of the driving unit of FIG. 2, shown on an enlarged scale and taken along the line III—III of FIG. 4.
FIG. 4 is a sectional front view of the part of FIG. 3, taken along the line IV—IV and showing an arrangement of a three-position automatic clamping clutch.
Figure 5:
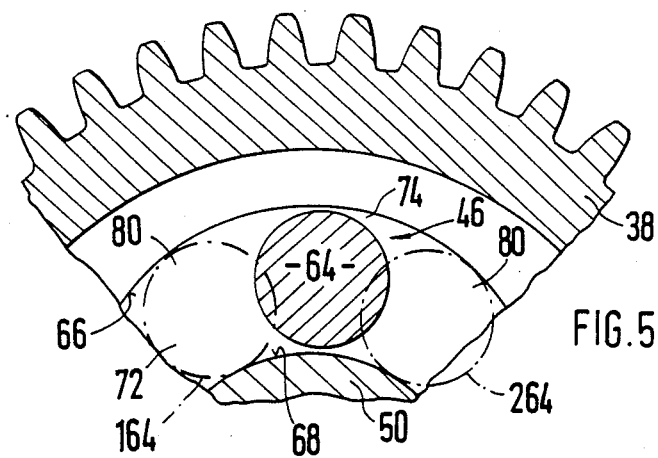
FIG. 5 shows on an enlarged scale a detail V of FIG. 4.

Referring now to FIGS. 3 to 5, an automatic coupling or clutch 46 is accommodated within transmission gears 36, 38, 40, 42 and 44. The coupling or clutch 46 depending on operational conditions of the locking system either establishes or interrupts the power transmission between the worm gear 38 and the pinion 40. The clutch includes an axle 48 fixedly mounted in the housing 30 and supporting for free rotation the pinion 40. For the sake of clarity the toothed rack 44 which is normally in mesh with the pinion, is omitted in FIG. 3. The pinion 40 is provided with a hub-shaped projection 50 extending fully into a recess 52 at the front end of the worm wheel 38. The opposite end face of the worm wheel is supported for rotation on the axle 48. The cylindrical or hub-shaped projection 50 is separated by the teeth of the pinion 40 by a flange 54 whose inner surface forms a limit stop for a carrier ring 58 which is rotatably supported on the hub-shaped projection 50. The carrier ring 58 is illustrated in detail in FIG. 6. The end side 60 of the carrier ring facing the bottom of the recess 52 in the worm wheel 38 has three recesses 62 spaced apart from each other by an angle 120°. As seen from FIG. 3, each of the recesses 62 serves for receiving an end of gripping or clamping rollers 64 located between an inner wall 66 of the recess 52 and the jacket 68 of the cylindrical projection 50 of the pinion. The axis of rotation of respective clamping rollers 64 extends substantially parallel to the axis of rotation of the pinion 40 and of the worm wheel 38. As illustrated in FIG. 3, the inner wall of the cup-shaped worm wheel 38 is provided with a step off portion 70 dividing the recess 52 into a region of larger inner diameter for receiving the carrier ring 58 and into a smaller region for accommodating the clamping roller 64. The inner wall 66 of the narrow region of the recess 52 is divided by bulges 76 into three uniformly shaped sections, as seen from FIG. 4. One of these sections is shown on an enlarged scale in FIG. 5. It is evident from FIGS. 3 to 5 that while a minor end portion of clamping roller 64 is enclosed in the recess 62 of the carrier ring 58, a major part of the clamping rollers is situated in an annular channel 72 delimited by the cylindrical jacket 68 of the hub-shaped projection 50 and by the inner wall 66 of the reduced section of the recess 52 in the worm wheel. As it will be explained below, the shape of the two limiting surfaces 66 and 68 of the annular channel 72 is of particular importance for the operation of the automatic three-position clutch. In this example, the jacket surface 68 of the hub-shaped projection 50 has a circular cross-section. However, the cross-section of the inner wall 66 of the recess which delimits the annular channel 72 is shaped such that for each clamping roller 64 an intermediate region 74 is provided which has a larger clearance than the diameter of the clamping roller (FIG. 5). Hence, in these intermediate regions 74 each clamping roller 64 is freely movable in the annular channel 72 and does not transmit any power from the worm gear to the pinion. At both sides of the intermediate region 74 the diameter of the inner wall 66 slightly decreases and accordingly the clearance of the corresponding sections 80 of the annular channel 72 decreases to match the diameter of the clamping roller. Accordingly, for each clamping roller 64 a working chamber results delimited by two of the bulges 76. As explained before, each working chamber defines a broad intermediate region 74 and two narrow end regions 80 in which the clearance of the annular channel 72 is smaller than the diameter of the clamping roller 64.

Figure 6:
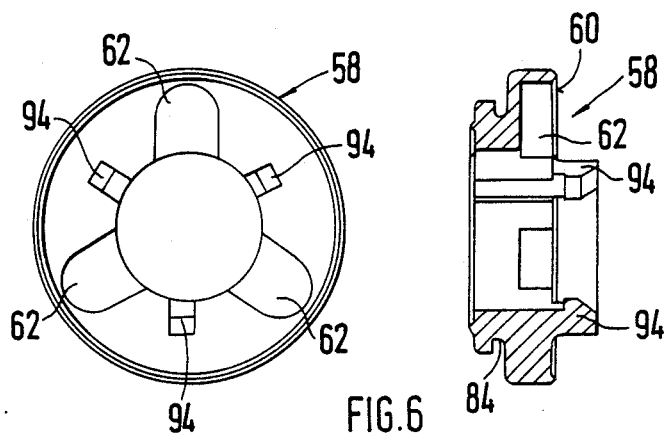
FIG. 6 shows in a front view and in a sectional side view of a carrier ring pertaining to the clutch of FIG. 4.
Figures 7, 8:
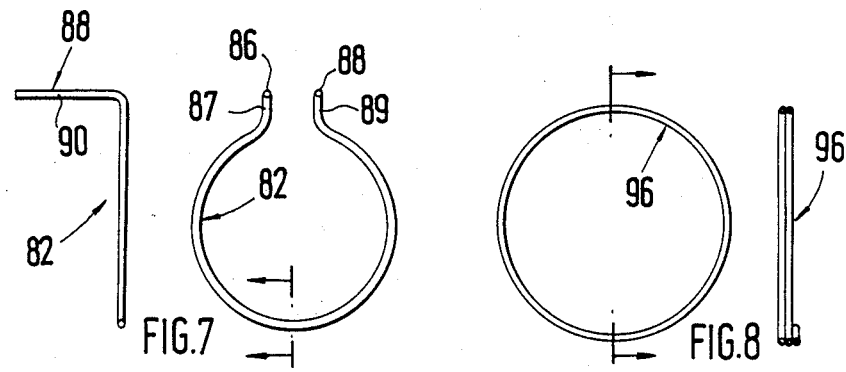
FIG. 7 shows in a side view and in a front view a grip spring in the clutch of FIG. 4.
FIG. 8 shows a front view and a side view of an expanding spring of the clutch of FIG. 4.

It will be seen from FIG. 3 that a loop or clip spring 82 is wrapped around the carrier ring 58. The loop spring 82 is accommodated in an annular groove 84 near the front end of the carrier ring (FIG. 6). The ends 86 and 88 of the loop spring 82 are in the form of straight legs 90 directed at right angles to the plane of the loop spring. The inner wall of the housing 30 of the driving unit is integrally connected with elongated stop pieces 92 projecting into the path of movement of the legs 90 of respective loop springs to form a stop for the latter. The rear side of the carrier ring 58 is further provided with three hook-shaped projections 94 for retaining an expanding helical spring 96 (FIG. 8). The arrangement of the expanding spring 96 in the grip clutch is evident from FIG. 3. The expanding spring is biased such as to exert a slight pressure against the clamping rollers 64 to keep them in contact with the inner wall 66 of the worm wheel 38. The loop spring 82 is also slightly biased to clip at slight tension against the retaining annular groove 84.

The operation of the drive of this invention is as follows: When the electric motor 12 is activated by means of an assigned switching device 24 and 26 to rotate in a direction in which the locking bolt 16 is shifted toward the locking receptacle 18, the worm wheel 38 (FIG. 2) starts rotating counterclockwise and the intermediary transmission member 44 constructed as a toothed rack starts moving in the direction of arrow 28. If the clamping clutch 46 is in its releasing intermediate position illustrated in FIGS. 4 and 5, it is only the worm gear 38 and the carrier 58 together with its loop spring 82 which are rotated counterclockwise until the legs 90 of the loop spring 82 are stopped by the stop member 92 on the housing 30. Then the loop spring 82 brings the carrier ring 58 to standstill and only the worm gear 38 is rotated, whereby the inner wall 66 of its recess is shifted relative to the clamping rollers 64 which are held in a fixed position by the carrier roller. So far, no rotary movement has been transmitted to the pinion 40 by its hub-shaped projection 50. Only after the clamping roller 64 has entered a narrow end region of respective working chamber, delimited by the bulges 76, a frictional connection is established between the inner wall 66 of the worm wheel 38 and the cylindrical surface of the hub-shaped sleeve 50. Consequently, the pinion 40 is driven by the clamped rollers 64 and a corresponding shifting of the toothed rack 44 in the direction of arrow 28 occurs. The shifting is performed so long until the locking bolt 16 reaches the locking receptacle 18. Then the electric motor 12 is switched off and the drive is inactivated. In this position a manual displacement of the locking bolt 16 from the locking receptacle 18 is not possible, because the clamping rollers 64 are still in their clamping positions in which a positive connection between the clamping bolt and the output side of the self-locking worm gearing 34. Accordingly the locked door of the vehicle could be opened only forcibly or by activating the drive 10 to rotate in opposite direction. When the key 26 is rotated in the switching device 24 to activate the motor 12 in a reverse direction, the worm wheel 38 starts rotating clockwise and by the beforedescribed process the clamping rollers 64 are transferred into their opposite clamping positions 80 in their working chambers. Up to this time point, the car door has been locked. Only when the clamping rollers have reached their clamping position clutch 46 starts transmitting the driving power from the electric motor 12 to the pinion 40, which in turn starts moving via the toothed rack 44 the locking pinion away from its locking receptacle 18. In this embodiment, the worm gear 38 represents a driving half of the coupling or clutch cooperating via the clamping roller 64 with the cylindrical or sleeve-shaped projection 50 of the pinion 40 acting as the driven half of the coupling. The actual coupling means are formed by the roller 64. The two operating positions 80 of a clamping roller 64 are indicated by dash and dot lines 164 or 264. The position of the clamping roller indicated by the full line and which coincides with region 74 of maximum clearance of the annular channel 72, is called a free running position. In the free running position, the toothed rack 44 and hence the locking bolt 40 can be manually shifted in the direction away from the locking receptacle 18. This so called free running or intermediate position of the clutch is useful when, due to a failure of the power supply, for example, manual shifting of the locking element is necessary. For this purpose the electronic control device 20 is designed such that after the locking bolt 16 has reached the locking receptacle 18, the electric motor 17 is momentarily, for example for 15 microseconds, energized in opposite direction whereby the clamping rollers 64 are displaced into their free running positions illustrated in FIG. 5.

From the foregoing it is evident that the driving device 10 works correctly then when it is insured that clamping rollers 64 are not stuck in their clamping position. Accordingly, the construction of the coupling must guarantee a problem-free release of the clamping rollers 64 from their clamping position when the worm wheel 38 starts rotating in a reverse direction.

While the invention has been illustrated and described as embodied in a door locking mechanism for a motor vehicle, it is not intended to be limited to the details shown, since various modifications and structural changes may be made without departing in any way from the spirit of the present invention. For example, it is conceivable to use this invention not only in central locking systems but also in drives for a sliding roof in the vehicle and the like.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A driving device for shifting a mechanical element, comprising a reversible driving motor; a reduction worm gearing connected to the driving motor; an intermediary transmission means operatively connected between the reduction worm gearing and the mechanical element to move the same on a predetermined path; and a clutch arranged between said worm gearing and said intermediary transmission means.

2. A driving device as defined in claim 1 wherein said clutch is a clamping clutch having a free running position in which it does not transmit power between said worm gearing and said intermediary transmission means.

3. A driving device as defined in claim 2, wherein the mechanical element comprises a locking bolt, said clamping clutch having a first clamping position that corresponds to a first direction of rotation of the driving motor in which said clamping clutch connects said worm gearing and said intermediary transmission means to move the locking bolt into a locking receptacle, a second clamping position that corresponds to a second direction of a rotation of the driving motor which is opposite to the first direction and in which said clamping clutch connects said worm gearing and said intermediary transmission means to move the locking bolt out of the locking receptacle, said free running position being between said first and second clamping position.

4. A driving device as defined in claim 3 wherein said worm gearing includes a worm shaft connected to said driving motor and a cup-shaped worm wheel in mesh with said worm shaft; said intermediary transmission means including a pinion supported for rotation on an axle and being in mesh with a toothed rack connected to said mechanical element; and said clutch including a power input half formed by an inner wall of said cup-shaped worm wheel, a power output half formed by an outer wall of a cylindrical sleeve supported for rotation on said axle and being rigidly connected to said pinion, and clamping rollers arranged between said inner and outer walls to move from said free running position into one of said clamping positions in dependency on the direction of rotation of the driving motor.

5. A driving device as defined in claim 4, wherein said inner and outer walls define an annular channel having a plurality of working chambers corresponding to a number of damping rollers and in which said damping rollers move, each working chamber having opposite end regions in which a clearance of the each working chamber is less than a diameter of a respective clamping roller, and an intermediate free running region in which the clearance of said annular channel exceeds the diameter of the respective clamping roller.

6. A driving device as defined in claim 4, further comprising an electronic control circuit for controlling rotation of said driving motor, said electronic control circuit momentarily reversing the direction of rotation of said driving motor for a short time before switching off said driving motor when said locking bolt reaches its locking position, to displace said clamping rollers into their free running position.

7. A driving device as defined in claim 5 wherein inner wall of said cup-shaped worm wheel is formed with a stepped off portion delimiting a cylindrical surface of larger diameter and a cylindrical surface of smaller diameter, and said annular channel being formed by the inner wall surface of the smaller diameter.

8. A driving device as defined in claim 7 wherein said inner wall surface of smaller diameter is divided by bulging projections into sector delimiting respective working chambers, the inner wall surface in each sector having an intermediate region of a larger radius of curvature corresponding to said free running position and lateral regions of increasing radii of curvature, said lateral regions corresponding to said clamping positions.

9. A driving device as defined in claim 8 further comprising a carrier ring supported for rotation on said cylindrical sleeve and being provided with recesses for accommodating end portions of said clamping rollers, and a flange formed on said cylindrical sleeve to limit axial movement of said carrier ring toward said pinion.

10. A driving device as defined in claim 9 further comprising a loop spring inserted in a circumferential groove of said carrier ring, said loop spring having end portions projecting into the housing of said drive unit, and stop pieces rigidly connected to said housing to form abutment for said end pieces of the loop spring.

11. A driving device as defined in claim 10 further comprising an expansion spring wound around said cylindrical sleeve to bias said clamping rollers against said inner wall surface of the worm wheel.

12. A driving device as defined in claim 11 wherein an end face of said worm gear remote from said pinion is provided with a bearing supported on said axle connected to the housing of said drive unit.

* * * * *